United States Patent [19]

Nakashima et al.

[11] Patent Number: 4,936,929
[45] Date of Patent: Jun. 26, 1990

[54] REFRACTORY AMORPHOUS CO-TA-HF ALLOY
[75] Inventors: Mikio Nakashima, Toyama; Akinori Kojima; Akihiro Makino, both of Nagaoka, all of Japan
[73] Assignee: Alps Electric Co., Ltd., Tokyo, Japan
[21] Appl. No.: 307,859
[22] Filed: Feb. 7, 1989
[30] Foreign Application Priority Data Mar. 23, 1988 [JP] Japan .................................. 63-68844

[51] Int. Cl.$^5$ ............................................. H01F 1/047
[52] U.S. Cl. ..................................... 148/304; 148/403; 420/435
[58] Field of Search ................. 148/304, 403; 420/435
[56] References Cited

U.S. PATENT DOCUMENTS

| | | | |
|---|---|---|---|
| 4,265,684 | 5/1981 | Boll | 148/121 |
| 4,557,769 | 12/1985 | Shimada et al. | 148/304 |
| 4,578,728 | 3/1986 | Sakakima et al. | 148/304 |
| 4,609,593 | 9/1986 | Nakashima et al. | 428/611 |

FOREIGN PATENT DOCUMENTS 63-020429 1/1988 Japan .................................. 148/304
61-142520 6/1986 Japan .................................. 148/304

Primary Examiner—Theodore Morris
Assistant Examiner—Margery S. Phipps
Attorney, Agent, or Firm—Guy W. Shoup; Paul J. Winters

[57] ABSTRACT

A soft magnetic amorphous ternary alloy of Co-Ta-Hf which comprises a composition represented by $Co_xTa_yHf_z$, wherein the composition ratio of x, y and z ranges, in atomic %, $81\% \leq x \leq 85\%$ $8\% \leq y \leq 13\%$ $5\% \leq z \leq 10\%$ $1 \leq y/z \leq 2.5$ and $x+y+z=100\%$. Thus, the refractory amorphous alloy has excellent thermal stability, preferable soft magnetic property, high mass productivity, and can be heat treated at 500° C. or higher.

1 Claim, 6 Drawing Sheets

REFRACTORY AMORPHOUS CO-TA-HF ALLOY

BACKGROUND OF THE INVENTION

1. Field of the Invention

This invention relates to a metal-metal amorphous alloy for use in various magnetic heads and, more particularly, to a refractory amorphous alloy which has excellent thermal stability and excellent soft magnetic properties.

2. Description of the Prior Art

A metal-metal amorphous alloy has a higher crystalizing temperature, and more excellent corrosion resistance than a conventional metal-semimetal amorphous alloy containing nonmetal. And the amorphous alloy containing special components has smaller magnetostriction and excellent soft magnetic properties, and for this reason they have been used as the materials of magnetic heads which are treated through a thermal history, such as glass bonding.

Generally, conditions required for the amorphous alloy for use in magnetic heads are as described below.

(1) Magnetostriction ($\lambda s$) is "0", or $\lambda s$ is nearly equal to "0".
(2) Saturation magnetic flux density (Bs) is large.
(3) Crystallization temperature (Tx) is high.
(4) Heat resistance is high.
(5) The relationship where Curie temperature (Tc) is lower than the crystallization temperature (Tx) is satisfied.

Of these conditions, with respect to the condition (1), the magnitude of the magnetostriction is very important. When an amorphous alloy thin film is formed on a ferrite substrate, for example, to manufacture a thin film magnetic head, magnetic anisotropy is induced in the amorphous alloy thin film by the stress generated according to the magnitude of the magnetostriction. Further, magnetic anisotropy is also induced by the thermal stress of glass bonding causing its thermal resistance to be deteriorated, and it is accordingly important to obtain a composition of $\lambda s = 0$ where $s \approx 0$. In order to obtain a magnetic head having high performance, it is needed to suppress the absolute value of the magnetostriction to approx. $5 \times 10^{-7}$ or lower to a low magnetostriction.

Of the conditions, the condition (2) is entirely contradictory to the condition (5). More specifically, it is desired to provide large saturation magnetic flux density, but if the saturation magnetic flux density is increased, the crystallization temperature decreases, and the thermal resistance reduces. Further, when the saturation magnetic flux density is increased, the crystallization temperature (Tx) and the Curie temperature (Tc) are reversed so as not to hold the relationship of Tc smaller than Tx. Thus, there arises a drawback that a heat treatment above the Curie temperature becomes difficult for the purpose of eliminating magnetic anisotropy. In addition, in view of the mass productivity of the magnetic heads, when a heat treatment is conducted and the relationship of Tc less than Tx is not satisfied, it is necessary to anneal it in a magnetic field. Thus, a large scale facility for a magnetic field generator is required, and the quantity of the materials to be treated is limited to reduce its productivity.

Therefore, if the relationship of Tc less than Tx is satisfied in the amorphous alloy, a nonmagnetic field annealing can be realized, and an annealing can be performed simultaneously upon glass bonding.

Then, Co-Nb-Zn amorphous alloy is heretofore known as an alloy for satisfying these conditions, and the temperature for stably heat treating the alloy is known to range from 480° C. to 500° C.

When magnetic heads are manufactured through glass bonding, it is known to improve the reliability of the magnetic head by setting highly the treating temperature, but the glass bonding to be conducted at the treating temperature of approx. 480° to 500° C. like in the case of the above-mentioned Co-Nb-Zr amorphous alloy remarkably lacks the reliability at present, and drawbacks, such as corrosions feasibly occur, and the reliability of the magnetic head obtained through the glass bonding is accordingly insufficient. Recently, low melting point glass has been developed as a glass bonding material for use in the magnetic heads of the amorphous alloy and can be bonded at relatively low temperature, but the glass bonding using the low melting point glass has still less reliability.

SUMMARY OF THE INVENTION

Accordingly, an object of this invention is to provide a refractory amorphous alloy which can eliminate the above-described disadvantages of the prior art and which has excellent thermal stability, preferable soft magnetic property, high mass productivity, and can be heat treated at 500° C. or higher.

In order to achieve the above and other objects of the invention, there is provided according to the present invention a refractory amorphous alloy of soft magnetic amorphous 3-element alloy of Co-Ta-Hf comprising a composition represented by $Co_xTa_yHf_z$, where the composition ratio of x, y and z is ranged by atomic $$81\% \leq x \leq 85\%$$
$$8\% \leq y \leq 13\%$$
$$5\% \leq z \leq 10\%$$
$$1 \leq y/z \leq 2.5$$

where $x+y+z=100\%$. Of the elements, Ta is amorphous element, the negative magnetostriction of the Co-Ta alloy is eliminated by Hf to realize zero magnetostriction.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the present invention will be described in detail with reference to the accompanying drawings.

A Co-Ta-Hf alloy target having 4 inches of a diameter was set in a high frequency sputtering apparatus having 200 W of input power, a sputtering was conducted under $5 \times 10^{-3}$ Torr of Ar gas to form a Co-Ta-Hf amorphous alloy having approx. 5 microns of thickness on a substrate. Various compositions of the thin films formed through such steps were prepared as samples, and following tests were conducted by the samples.

Figure 1:
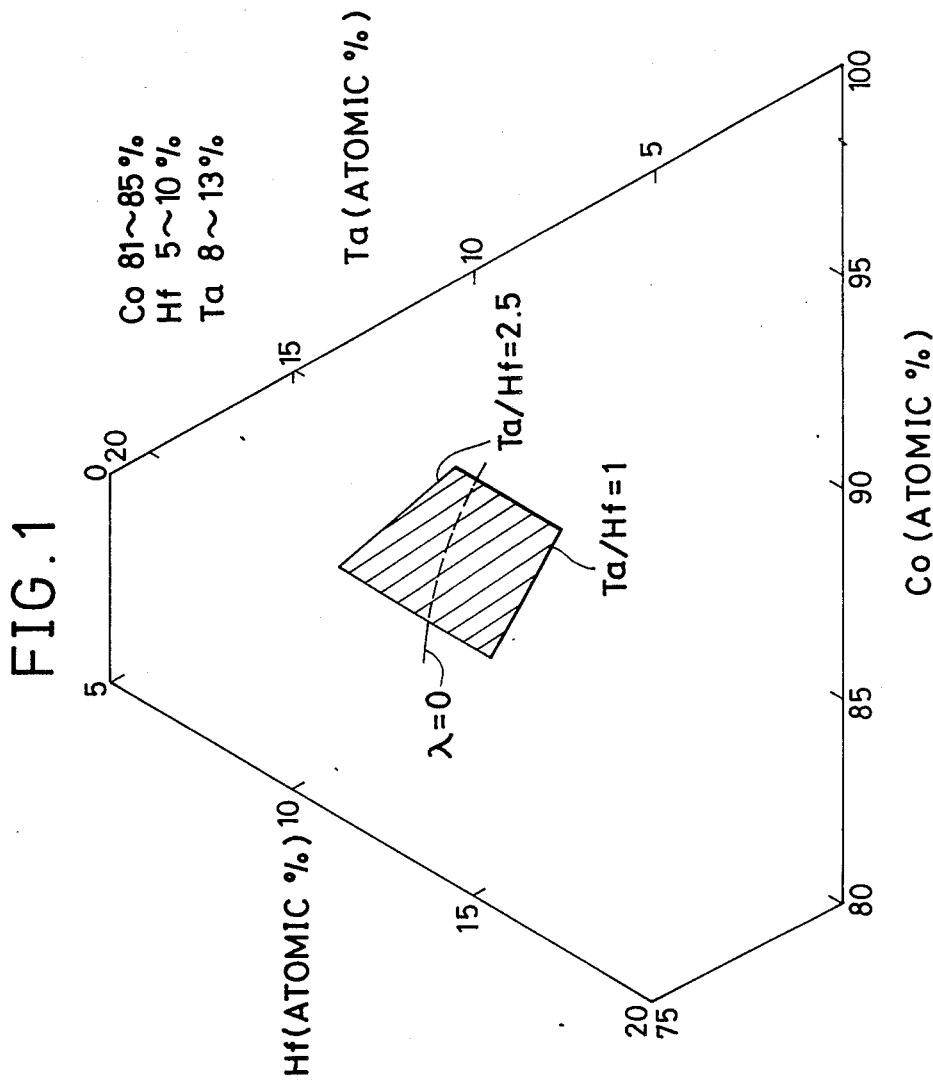
FIG. 1 is an approximately triangular composition diagram showing generally the relationship between the composition ratio of Co, Ta and Hf and preferable magnetic properties.

FIG. 1 shows zero magnetostriction and low magnetostriction range of Co-Ta-Hf amorphous alloy, in which a shaded range illustrates preferable magnetic properties. The composition of this range contains 81 to 85% of Co content, 8 to 13% of Ta content, and 5 to 10% of Hf content.

The Co content is limited by the saturation magnetic flux density, and in order to obtain the saturated magnetic flux density at 6000 G or higher, it is necessary to contain 81% or more of the Co content, and in order to satisfy the relationship of Curie temperature (Tc) smaller than crystallization temperature (Tx), it is necessary to contain 85% or less of Co content. Further, zero magnetostriction depends upon the ratio of Ta/Hf and also depends upon the Co content. If the Co content decreases, the value of Ta/Hf tends to vary from "2" to "1". Further, the composition of λs=0 is designated by a dotted broken line in FIG. 1, and the shaded range contains $5 \times 10^{-7}$ or less of the absolute value of the magnetostriction (λs).

Figure 2:
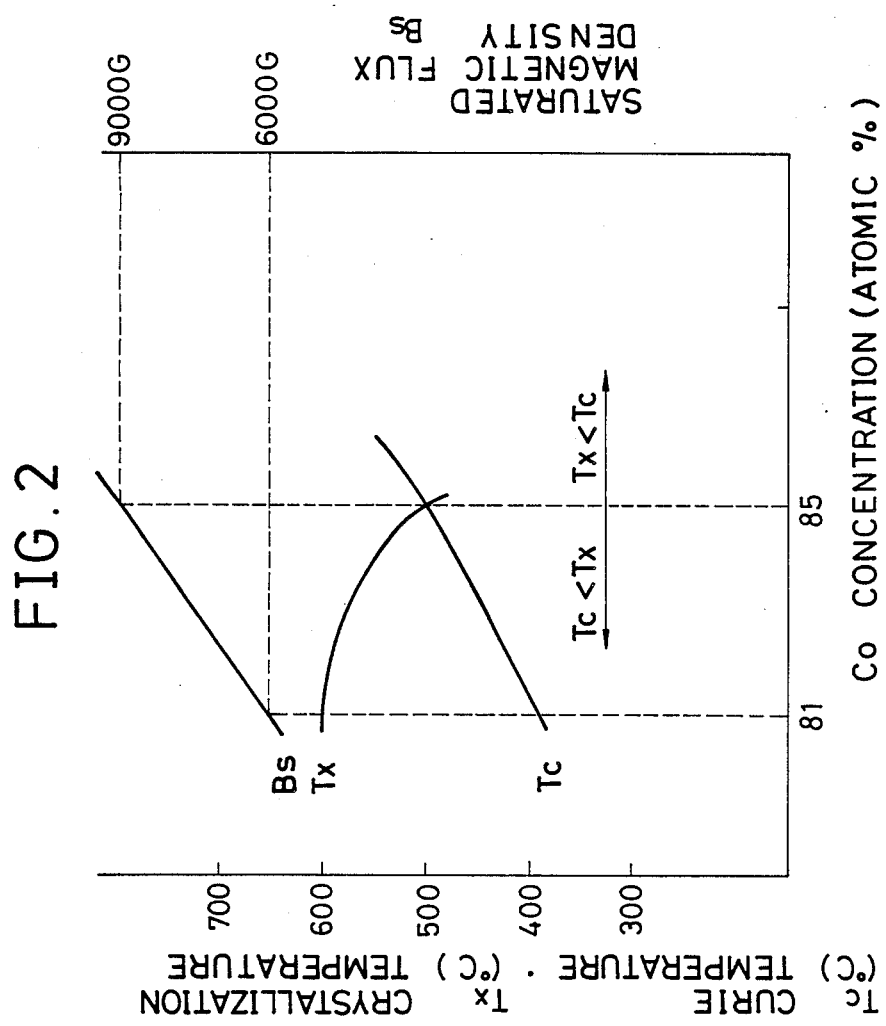
FIG. 2 is a diagram showing the relationship between saturation magnetic flux density, crystallization temperature and Co concentration with respect to Curie temperature of the test results of the amorphous alloy according to the present invention.

FIG. 2 shows the composition dependency of the saturation magnetic flux density (Bs), the Curie temperature (Tc) and the crystallization temperature (Tx) of the Co-Ta-Hf alloy.

As apparent from FIG. 2, Co concentration is 81 % or higher, Bs is 6000 G or higher, when the Co content is 85%, the Bs becomes 9000 G, and further Tc becomes nearly equal to Tx with this concentration.

Therefore, the relationship of Tc smaller than Tx can be realized when the Co concentration is 85% or less (Bs is 9000 G or less). In this case, it is evident to anneal the alloy in nonmagnetic field. In other words, it is understood that the range of 81to 85% of the Co concentration is preferable.

Figure 3:
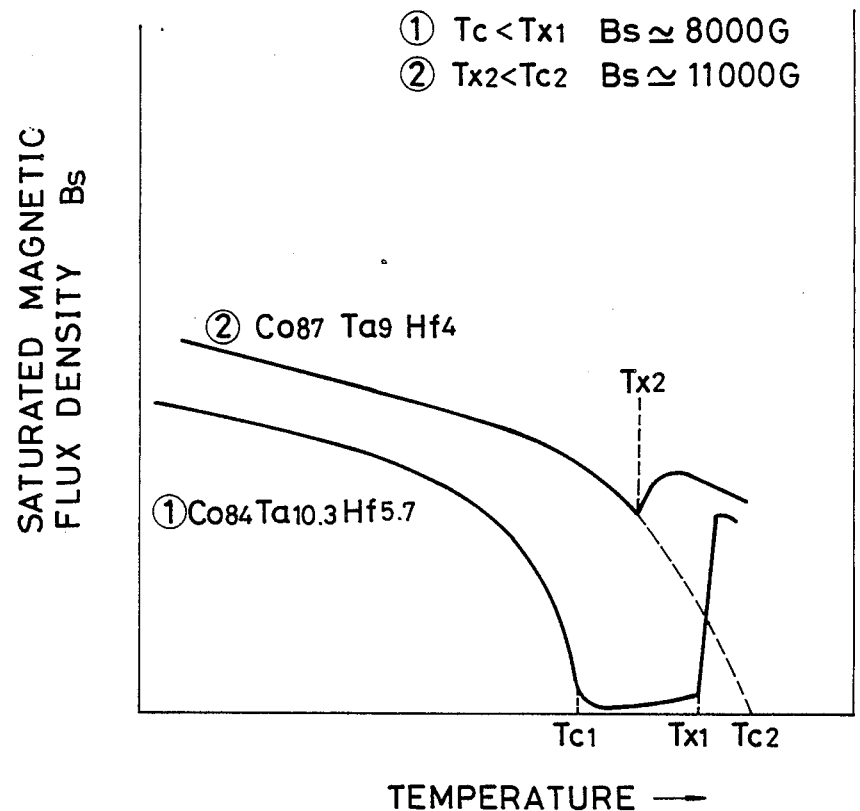
FIG. 3 is a diagram showing the relationship between saturation magnetic flux density and temperature.

FIG. 3 shows the composition dependency of the B-T curve of the Co-Ta-Hf alloy. In FIG. 3, the curve (1) illustrates the temperature change of the magnetization of the amorphous alloy thin film (Bs nearly equal to 8000 G) having the composition of the present invention represented by $Co_{84}Ta_{10.3}Hf_{5.7}$, and the curve (2) illustrates the temperature change of the magnetization of the amorphous alloy thin film (Bs nearly equal to 11000 G) containing the composition out of the present invention represented by $Co_{87}Ta_9Hf_4$.

In the case of the amorphous alloy thin film represented by the curve (1), when an annealing is executed at temperatures of $Tc_1 < T < Tx_1$, the induction of magnetic anisotropy is prevented while high permeability can be obtained. In the case of the amorphous alloy thin film designated by the curve (2), it becomes $Tx_2 < Tc_2$. Even if an annealing is executed at temperature equal to or lower than $Tx_2$, it is $Tc_2$ or higher. Thus, the magnetic anisotropy remains, and the permeability remains low. Generally, in the case of Tx less than Tc, it is known to obtain high permeability by annealing the alloy in a magnetic field. For example, the magnetic anisotropy can be prevented by annealing the alloy in a revolving magnetic field, but an expensive and large-scale magnetic field generator is required, and the number of alloys to be treated is limited to decrease the productivity.

Figure 4:
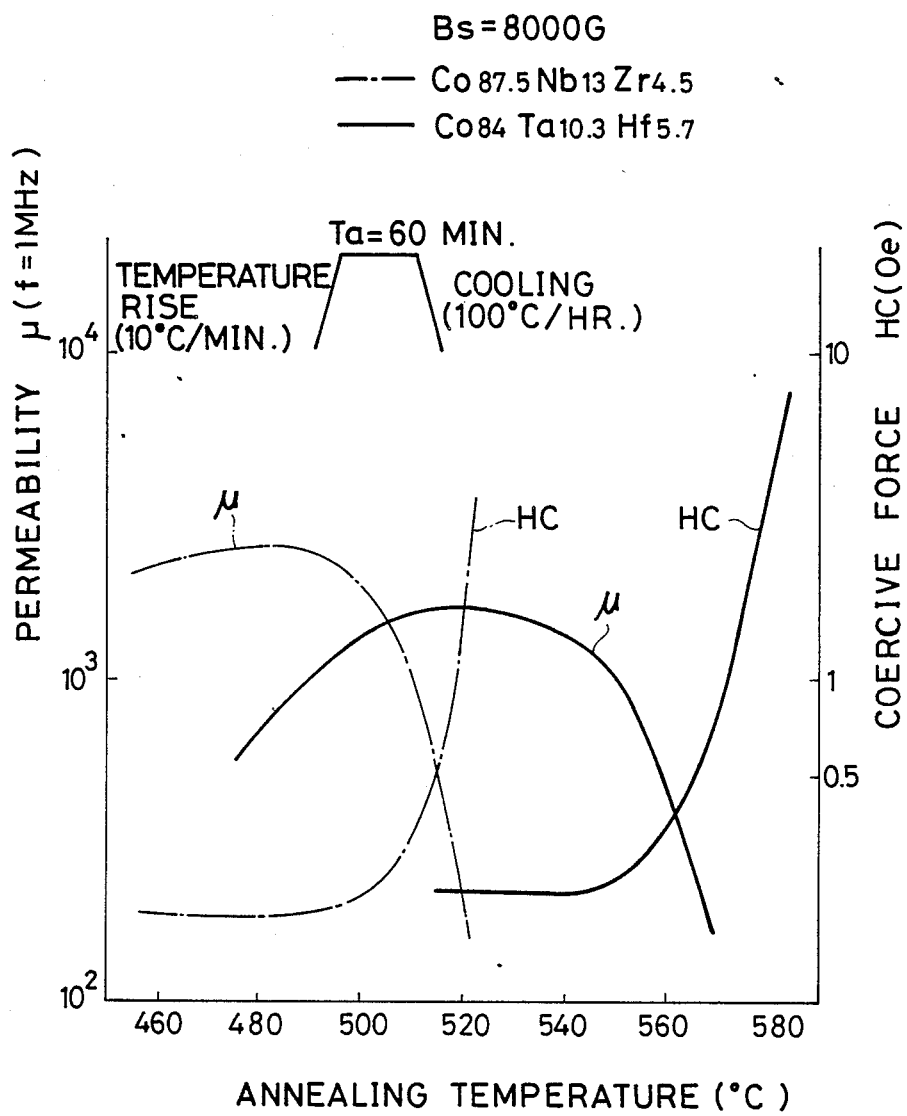
FIG. 4 is a diagram showing the relationship between permeability and annealing temperature with respect to coercive force.

FIG. 4 shows the comparison results of the thermal resistances of the Co-Ta-Hf amorphous alloy of the composition ($Co_{84}Ta_{10.3}Hf_{5.7}$) of the present invention and conventional Co-Nb-Zr amorphous alloy ($Co_{87.5}Nb_{13}Zr_{14.5}$) in the same saturated magnetic flux density (8000 G).

It is understood that the conventional Co-Nb-Zr amorphous alloy has refractory temperature near at 500° C. from the state of the deteriorations of the permeability (μ) and the coercive force (Hc), while the Co-Ta-Hf amorphous alloy of the composition of the present invention exhibited high heat resistance of approx. 540° C.

Figure 5:
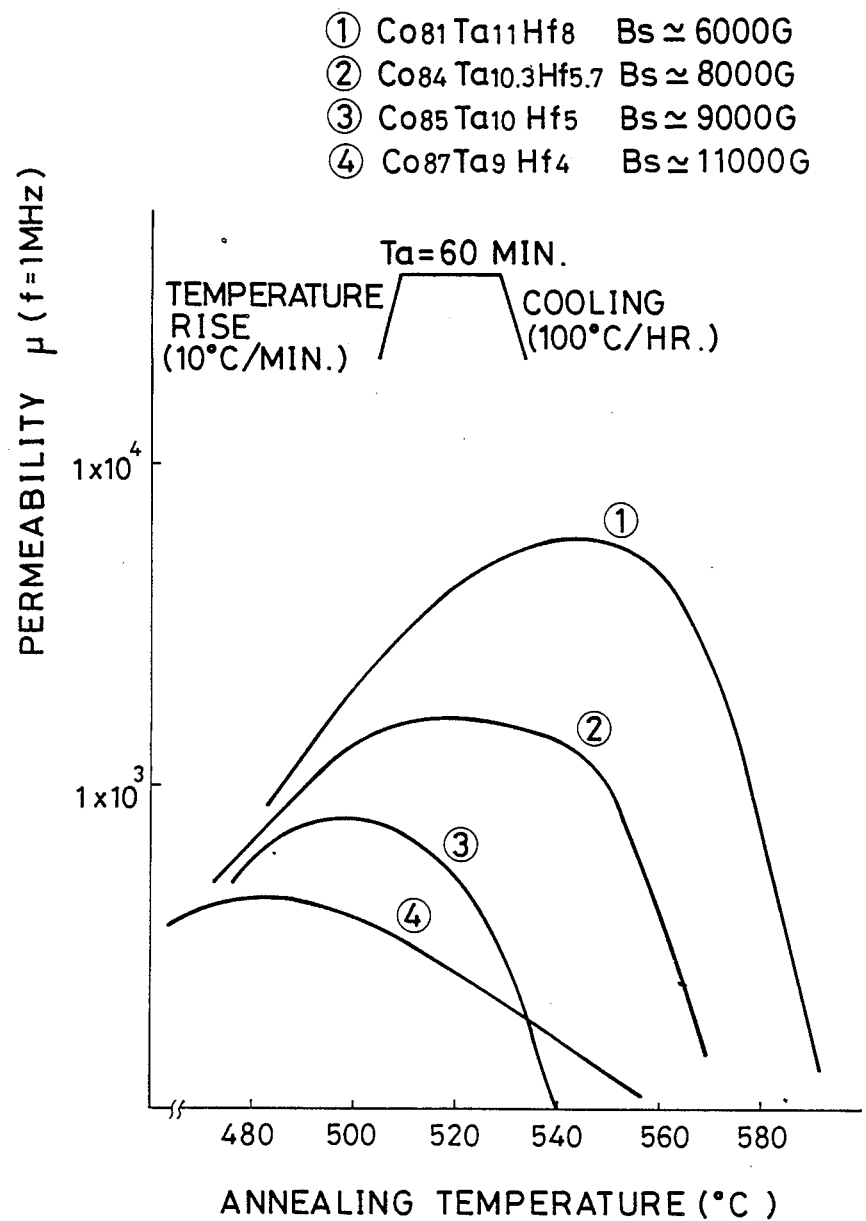
FIG. 5 is a diagram showing the relationship between permeability and annealing temperature.

FIG. 5 shows the comparison results of the permeability and the heat resistance of the Co-Ta-Hf amorphous alloy. In FIG. 5, the curve (1) shows the characteristics of the amorphous alloy (Bs nearly equal to 6000 G) of the composition represented by $Co_{81}Ta_{11}Hf_8$, the curve (2) shows the characteristics of the amorphous alloy (Bs nearly equal to 8000 G) of the composition represented by $Co_{84}Ta_{10.3}Hf_{5.7}$, the curve (3) shows the characteristics of the amorphous alloy (Bs nearly equal to 9000 G) of the composition represented by $Co_{85}Ta_{10}Hf_5$, and the curve (4) shows the characteristics of the amorphous ally (Bs nearly equal to 11000 G) represented by $Co_{87}Ta_9Hf_4$.

The curves (1), (2) and (3) in FIG. 5 show the characteristics of the amorphous alloys containing the compositions of the present invention, and it is apparent to improve the permeability by annealing the alloy. On the contrary, the amorphous alloy of the composition out of the present invention shown by the curve (4) is not expected for improving the permeability.

Figure 6:
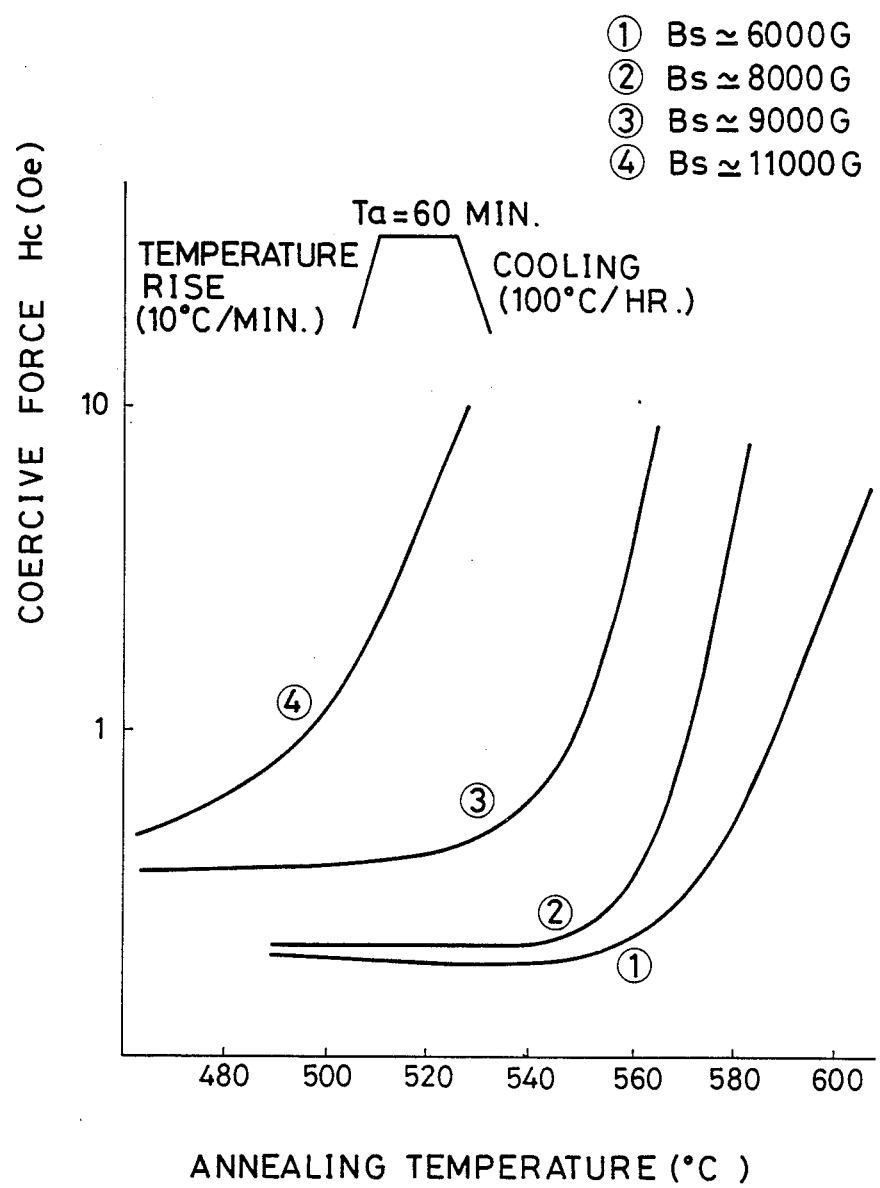
FIG. 6 is a diagram showing the relationship between the coercive force and the annealing temperature.

FIG. 6 shows the comparison results of the coercive force and the heat resistance of the Co-Ta-Hf amorphous alloy. The samples shown by the curves (1) to (4) in FIG. 6 are amorphous alloys containing the same composition as those of the sample in FIG. 5.

As apparent from the results of FIG. 6, the amorphous alloys (1), (2) and (3) of the compositions of the present invention all exhibit heat resistance of approx. 520° C., and it is clarified that the heat resistance of the amorphous alloy of the present invention provides excellent heat resistance as compared with that of the conventional amorphous alloy.

When magnetic heads are manufactured of the amorphous alloy of the composition according to the present invention, glass bonding can be performed at temperature over 500° C. to improve the reliability of the glass bonding and to apparently improve the corrosion resistance of the amorphous alloy. Since the temperature of the glass bonding can be improved, the selecting range of the glass for use in the glass bonding can be broadened.

As described above, the heat resistance of the amorphous alloy of the present invention is improved as compared with the conventional alloy of this type. Accordingly, the amorphous alloy thin film for high refractory magnetic heads can be provided to obtain an effect of glass bonding at higher temperature than that of the conventional alloy. Therefore, when the magnetic heads are formed of the amorphous alloy of the present invention, the glass bonding can be performed at higher temperature than that of the conventional glass bonding to improve the reliability of the magnetic heads. Further, since the magnetic properties of the alloy by annealing in the nonmagnetic field can be improved, the steps of glass bonding and heat treating can be achieved in the same step to simplify the manufacturing steps or the magnetic heads and also to enhance the mass productivity thereof.

What is claimed is:

1. A refractory amorphous alloy comprising a composition represented by $Co_xTa_yHf_z$, where the composition ratio of x, y and z is ranged by atomic %

$$81\% \leqq x \leqq 83.8\%$$

$$8\% \leqq y \leqq 13\%$$

$$5\% \leqq z \leqq 10\%$$

$$1 \leqq y/z \leqq 2.5$$

where $x+y+z=100\%$.

* * * * *